United States Patent [19]

Tanaka et al.

[11] 4,443,741
[45] Apr. 17, 1984

[54] DRIVE CIRCUIT FOR ELECTROLUMINESCENT ELEMENT

[75] Inventors: Katsuyuki Tanaka, Kamakura; Shin-ichi Ohashi, Chigasaki; Masakatsu Saito; Tohru Sampei, both of Yokohama, all of Japan

[73] Assignee: Hitachi, Ltd., Tokyo, Japan

[21] Appl. No.: 301,944

[22] Filed: Sep. 14, 1981

Related U.S. Application Data

[63] Continuation of Ser. No. 66,653, Aug. 15, 1979.

[30] Foreign Application Priority Data

Aug. 21, 1978 [JP]  Japan .................................. 53-100924

[51] Int. Cl.³ .......................................... H05B 37/02
[52] U.S. Cl. .................................. 315/307; 315/169.3; 315/158; 340/781
[58] Field of Search ............... 315/169.3, 246, 291, 315/307, 158; 250/483, 205; 340/781

[56] References Cited

U.S. PATENT DOCUMENTS

| | | | |
|---|---|---|---|
| 2,972,694 | 2/1961 | Thornton | 340/781 |
| 3,075,122 | 1/1963 | Lehmann | 340/781 |
| 3,215,843 | 11/1965 | Neil | 250/205 |
| 3,486,028 | 12/1969 | Schade | 250/552 |
| 3,575,634 | 4/1971 | Kohasi et al. | 340/781 |
| 3,675,075 | 7/1972 | Kohasi et al. | 340/781 |
| 3,705,316 | 12/1972 | Burrous | 250/205 |
| 3,889,151 | 6/1975 | Hanak et al. | 340/781 |
| 3,961,193 | 6/1976 | Hudson | 250/324 |
| 4,156,166 | 5/1979 | Shapiro et al. | 315/307 |
| 4,182,977 | 1/1980 | Stricklin | 315/158 |
| 4,352,013 | 9/1982 | Fasig et al. | 250/205 |

OTHER PUBLICATIONS

"Electroluminescence", by J. I. Pankove, Topics in Applied Physics, vol. 17, pp. 197–199.

*Primary Examiner*—Harold Dixon
*Attorney, Agent, or Firm*—Antonelli, Terry & Wands

[57] ABSTRACT

A drive circuit for an electroluminescent (EL) element whose brightness can be changed by changing a voltage or the frequency of the voltage applied to the EL element and can be kept constant by keeping the current flowing through the EL element constant is disclosed. The drive circuit is provided with a drive power source whose output voltage or output voltage frequency is variable by a control signal. The output of the drive power source is supplied to the EL element. The current flowing through the EL element is detected by a current detecting element and a signal related to the detected current is applied as the control signal to the drive power source to subject the EL element to a constant-current drive.

9 Claims, 8 Drawing Figures

DRIVE CIRCUIT FOR ELECTROLUMINESCENT ELEMENT

This is a continuation of Ser. No. 066,653, filed Aug. 15, 1979.

This invention relates to drive circuits for use with electroluminescent elements (hereinafter referred to simply as EL elements), and more particularly to a drive circuit for driving an EL element so as to compensate the deterioration of the brightness of the EL element due to its variation with time, thereby providing a substantially constant brightness. This invention is specifically adapted for the application to an EL element whose brightness varies with the corresponding change of output current, e.g. a dispersion type EL element.

The background of this invention and this invention itself will be described in conjunction with the accompanying drawings, in which.

First, the background of this invention will be described referring to FIGS. 1 to 5.

Figure 1:
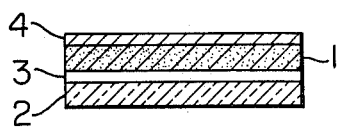
FIG. 1 shows in cross section a dispersion type an EL element.
Figure 2:
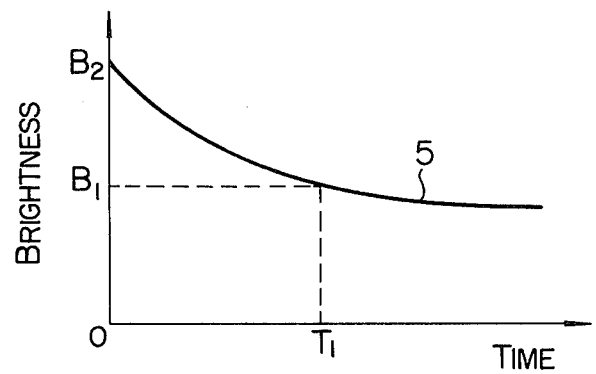
FIG. 2 is the time versus brightness characteristic of the dispersion type EL element as shown in FIG. 1.

FIG. 1 shows in cross section a dispersion type ac EL element in current use. This type of ac EL element has a luminescent layer 1 formed of dielectric material dispersed with fluorescent material including zinc sulfide (ZnS) and copper (Cu) as an additive serving as an activating agent. The EL element also has a glass plate 2 and a Nesa (trade name) film 3 formed on the glass plate 2, the Nesa film 3 serving as a face electrode. The luminescent layer 1, 20–30 $\mu$m thick, is deposited on the Nesa film 3. An aluminum layer 4 serving as a back electrode is provided on the luminescent layer 1. When an ac voltage is applied between the face and back electrodes 3 and 4, the EL element is excited into luminescence.

On the other hand, a dispersion type dc EL element has a luminescent layer different than that of the dispersion type dc EL element. The luminescent layer of the dc EL element is composed of particles of fluorescent material (ZnS) coated with copper or the like. When a dc voltage is applied between the electrodes, a dc current flows between the electrodes through copper, thereby exciting the EL element into luminescence.

In general, the conventional dispersion type ac EL element is driven by an ac voltage having a constant amplitude and a constant frequency while the conventional dispersion type dc EL element is driven by a constant dc voltage. In the case where such a dispersion type EL element is driven with a constant voltage (and a constant frequency), the brightness versus time characteristic of the element changes as shown by a curve 5 in FIG. 2. In the figure, the abscissa represents time and the ordinate represents brightness. $B_2$ indicates the initial brightness, $B_1$ the half-reduced brightness, and $T_1$ is a time instant at which the brightness is reduced to the half-value $B_1$ of the initial brightness. With an EL used in the present inventors' experiment, the brightness initially set at 200 lm/m$^2$ was reduced to the half-value after about 500 hours. As apparent from the curve 5 in FIG. 2, the brightness of luminescence decreases exponentially with time. This exponential characteristic of decrease causes considerable problems in the case of using EL elements. Namely, the initial brightness $B_2$ must have an extraordinarily high value to provide a practically sufficient brightness at the half-brightness time $T_1$. If the initial brightness $B_2$ is too high when the EL element is used as a display element, the illumination will be hard to see. Also, when a pattern is displayed by using a plurality of EL elements, the brightnesses of elements which have been used for a long period of time are clearly different from those which have not been used for very long, and the overall display is adversely contrasted.

Figure 3:
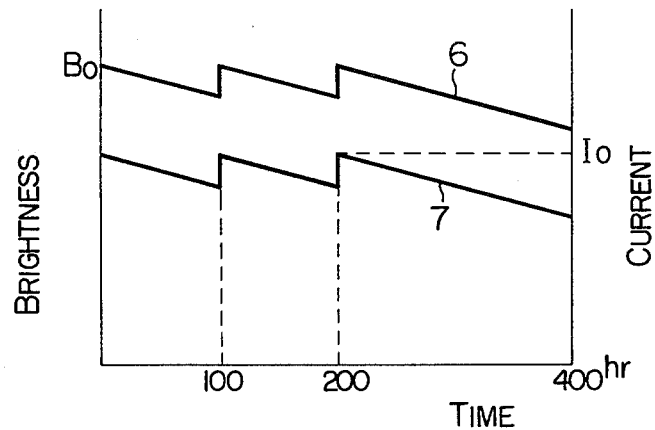
FIG. 3 shows the time versus brightness characteristic and the time versus output current characteristic of a dispersion type EL element.

In order to solve these problems, the present inventors have researched into the phenomenon of the reduction in brightness of the dispersion type EL element and have determined that the current through the EL element decreases in a certain relationship with the time-dependent variation in brightness of the EL element. This relationship is shown in FIG. 3. In the figure, the abscissa represents time, the left-hand side ordinate gives brightness, and the right-hand side ordinate measures current through the EL element. The changes in brightness and current are represented by curves 6 and 7, respectively. As is apparent from the curve 6, the brightness decreases almost linearly with time if the time lapse is as short as 100 hours. Further, the linear decrease in brightness is accompanied by a linear decrease in current flowing through the EL element, as represented by the curve 7. For example, with a dispersion type ac EL element prepared for the present inventors' experiment, when the brightness which was initially chosen to be 100 lm/m$^2$ it was reduced to 90 lm/m$^2$ after 100 hours. The corresponding initial current and the current after 100 hours were 10 A/m$^2$ and 9 A/m$^2$ respectively. On the basis of these facts, the present inventors have found out that if the current flowing through the EL element after 100 hours is increased up to 10 A/m$^2$, a brightness equal to the initial brightness can be obtained even after the passage of 100 hours. Further, the same brightness could be obtained still after 200 hours or 400 hours by increasing the current up to 10 A/m$^2$.

Figure 4:
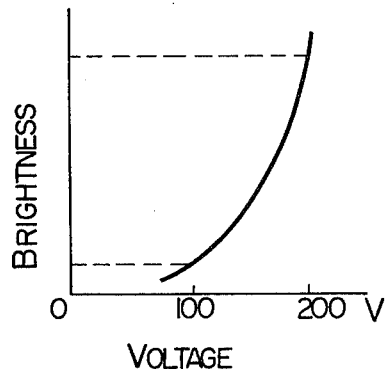
FIG. 4 shows the voltage versus brightness characteristic of a dispersion type EL element.
Figure 5:
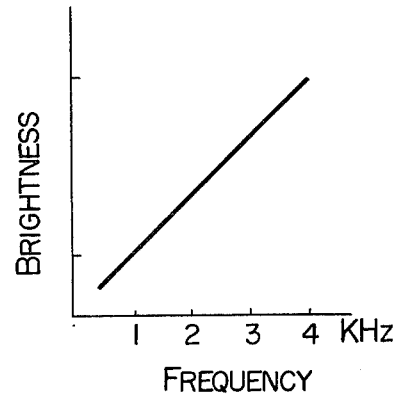
FIG. 5 shows the frequency versus brightness characteristic of a dispersion type EL element.

As well known, the brightness of a dispersion type EL element is related to the voltage applied to the EL element, as shown in FIG. 4. In this figure, the voltage is measured along the abscissa and the brightness along the ordinate. As shown, the brightness increases in proportion to the second to the third power of the voltage. For example, with a dispersion type EL element used in the present inventors' experiment, the brightness at the voltage of 200 V was 800 lm/m$^2$ while the brightness at the voltage of 100 V was 200 lm/m$^2$. It is also well-known that the brightness of a dispersion type EL element is related to the frequency of the voltage applied to the element, as shown in FIG. 5. As apparent from the figure, the brightness increases in proportion to the frequency.

The above consideration now leads to the conclusion that the brightness of luminescence of the dispersion type EL element can be kept constant by maintaining the current through the element constant while the brightness can be changed by changing the voltage applied to the element or the frequency of the voltage, thereby changing the current through the element.

One object of this invention is to provide a novel and useful EL element.

Another object of this invention is to provide a drive circuit for an EL element which can retain the brightness of luminescence of the element constant over a long time.

To that end, this invention provides a circuit for driving an electroluminescent element whose brightness can be changed by changing a voltage or the frequency of the voltage applied to said electroluminescent element and can be kept constant by keeping the current flowing through said electroluminescent element constant, said circuit comprising, a drive power source whose output voltage or output voltage frequency is variable by the application of a control signal thereto, means for applying the output of said drive power source to said electroluminescent element, a current detecting element connected with said electroluminescent element for detecting the current flowing through said electroluminescent element, means for generating as said control signal a signal related to the current detected by said current detecting element, and means for applying said control signal to said drive power source to keep the current flowing through said electroluminescent element constant.

Figure 6:
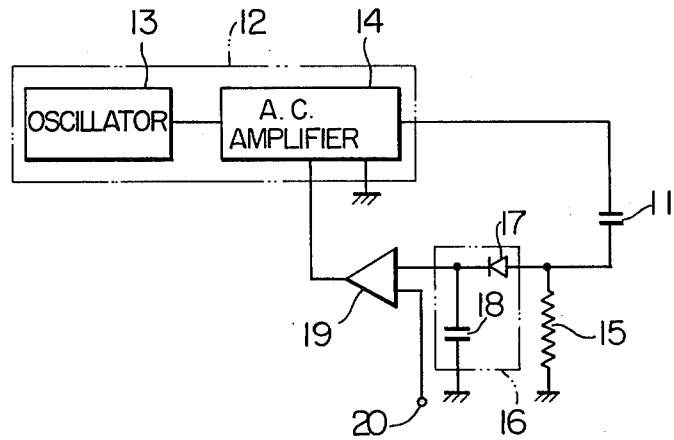
FIGS. 6 to 8 show EL element driving circuits as embodiments of this invention.
Figure 7:
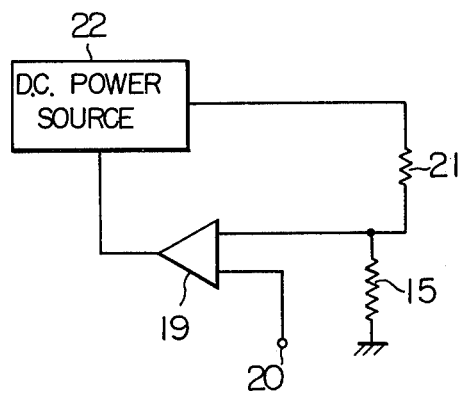
Figure 8:
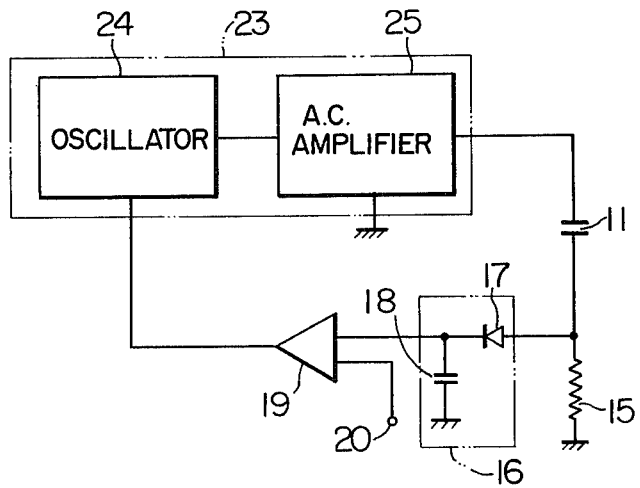

Embodiments of this invention will be now described with the aid of FIGS. 6 to 8.

FIG. 6 shows as an embodiment of this invention a drive circuit for a dispersion type ac EL element, in which the current through the element is kept constant by controlling the voltage across the element through the detection of the output current of the element.

In FIG. 6, reference numeral 11 designates a dispersion type ac EL element and numeral 12 indicates a drive power source for the EL element 11, composed of an oscillator 13 for generating a signal having a constant frequency and a voltage-controlled ac amplifier 14. The ac signal of constant frequency from the oscillator 13 is amplified by the ac amplifier 14 and then supplied to the EL element 11. A resistor 15 having its one end connected with the EL element 11 and the other end grounded is provided for detecting the current through the EL element 11. Thus, a voltage corresponding to the ac current through the element 11 is obtained at the non-grounded end of the resistor 15. A rectifying circuit 16 includes a diode 17 and a smoothing capacitor 18. In a comparator 19 which may be a differential amplifier, a voltage obtained at a first input through the rectification of the voltage across the resistor 15 by the rectifying circuit 16 is compared with a reference voltage supplied to a second input from a terminal 20. The resulting difference voltage is fed back to the voltage-controlled ac amplifier 14 to control the gain of the amplifier 14.

With this drive circuit shown in FIG. 6, when the brightness of luminescence of the EL element 11 is being kept at a desired level and the current through the EL element 11 is also kept constant at a predetermined value, the voltage obtained by rectifying and smoothing the ac voltage developed across the resistor 15 equals the reference voltage supplied to the terminal 20 so that the amplifier 14 is operating with a predetermined gain. However, when the brightness of luminescence falls due to its variation with time, the current through the EL element 11 also decreases to lower the voltage across the resistor 15 and therefore the output voltage of the rectifying circuit 16. Accordingly, the output voltage of the rectifying circuit 16 becomes lower than the reference voltage at the terminal 20. Then, the comparator 19 delivers an output corresponding to the voltage difference. This output increases the gain of the ac amplifier 14 so that the current through the EL element 11 regains the initial predetermined value to cause the element 11 to resume the initial desired brightness.

As described above, according to this invention, the current through the EL element 11 is detected so that the gain of the ac amplifier is controlled in accordance with the detected current, thereby always keeping the current through the element 11 constant. As a result, a constant brightness can always be obtained.

In the drive circuit shown in FIG. 6, the capacitance of the EL element 11 is usually about 1000 pF/cm$^2$. Therefore, if the element 11 has an active or luminescent area of 1 cm$^2$ and if the element 11 is driven by a signal having a frequency of 500 Hz, the impedance of the element 11 is about 320 kΩ. Accordingly, when the value of the resistor 15 is 1 kΩ and when an ac voltage applied across the series circuit of the EL element 11 and the resistor 15 is 200–300 Vp-p, then the voltage developed across the resistor 15 is 0.6–1.0 $V_{p-p}$ which value is sufficient for the detection of the associated current and also has no adverse influence upon the luminescence of the element.

In FIG. 6, the oscillator 13, the voltage-controlled ac amplifier 14 and the comparator 19 may be of well-known types and therefore any further description thereof will be omitted.

FIG. 7 shows as another embodiment of this invention a circuit for driving a dispersion type dc EL element by a constant current.

In FIG. 7, reference numeral 21 denotes a dispersion type dc EL element and numeral 22 a voltage-controlled dc power source which may be of well-known type. With this circuit, like the circuit shown in FIG. 6, when the EL element 21 is luminescing with a desired brightness and when the current through the EL element 21 has a predetermined value, the voltage developed across the resistor 15 equals the reference voltage applied to the terminal 20 and the dc power source 22 continues to supply a desired voltage to the EL element 21. On the other hand, when the brightness falls due to its variation with time so that the current through the EL element 21 decreases, the comparator 19 delivers an output voltage corresponding to the difference between the voltage developed across the resistor 15 and the reference voltage supplied at the terminal 20. The output of the comparator 19 is fed back to the voltage-controlled dc power source 22, thereby increasing the output voltage of the source 22. Thus, the current through the EL element 21 continues to increase until the voltage across the resistor 15 becomes equal to the reference voltage at the terminal 20. As a result, the brightness is kept constant.

In the circuit shown in FIG. 7, the dispersion type dc EL element 21 is a resistive element having a resistance of about 25 kΩ/cm$^2$. Therefore, if the element 21 has an active or luminescent area of 1 cm$^2$, the resistance of the element 21 is about 25 kΩ. The resistance of the resistor 15 serving as a current detecting element may be set at about 100Ω.

FIG. 8 shows as still another embodiment of this invention a constant-current drive circuit for a dispersion type ac EL element, in which the current through the EL element is kept constant by controlling the frequency of a driving voltage supplied to the EL element.

In FIG. 8, a drive power source 23 for the dispersion type ac EL element 11 is constituted of a voltage-controlled and variable-frequency oscillator 24 and an ac amplifier 25. The difference of this circuit from that shown in FIG. 6 is that the output of the comparator 19 is supplied to the oscillator 24. In this circuit, too, when the current through the EL element 11 decreases due to its variation with time to lower the brightness of luminescence of the EL element 11, the comparator 19 delivers a voltage corresponding to the difference between the output voltage of the rectifying circuit 16 and the reference voltage at the terminal 20. The output voltage of the comparator 19 causes the oscillation frequency of the voltage-controlled variable-frequency oscillator 24 to increase up to a value for which the output voltage of the rectifying circuit 16 equals the reference voltage at the terminal 20. Then, the reached value becomes stable so that the current through the EL element 11 is kept constant at a predetermined value. Namely, the current through the EL element 11 is controlled to a constant value and therefore the brightness of the EL element 11 can be kept constant.

According to the embodiments shown in FIGS. 6 to 8, the brightness compensation can be effected until the output voltage of the drive power source 12 or 22 reaches its upper limit or until the frequency of the output signal of the variable-frequency oscillator 24 becomes maximum.

As described above, according to this invention, the current flowing through the EL element is detected and the voltage or the frequency of the voltage of the drive power source is so controlled as to keep the current through the EL element constant, whereby a constant brightness can be always obtained by the use of a simple circuit configuration.

Although this invention has been explained in the above description as applied to drive the dispersion type EL element, this invention is by no means limited such dispersion type elements. Instead, it can be equally applied to an EL element of any type wherein the brightness can be changed in correspondence with the current flowing through the element as well as the voltage or the frequency of the voltage applied to the element.

Further, the resistor 15 used in the embodiments of FIGS. 6 to 8 as a current detecting element may be replaced by any means having a current detecting function, e.g. a reactance element such as a current transformer.

The connection of the current detecting element such as a resistance or reactance element with the dispersion type ac EL element brings about an auxiliary effect that the resistance or reactance of the current detecting element suppresses the peak value of the pulse current flowing through the EL element as a capacitive element, whereby the overload of the drive power source and the electrical impact upon the element to be driven can be prevented.

We claim:

1. A circuit for driving a dispersion type electroluminescent element whose brightness of luminescence can be changed by changing a voltage applied to said electroluminescent element and can be kept constant by keeping the current flowing through said electroluminescent element constant, said circuit comprising:
   a drive power source having an oscillator and a voltage-controlled ac amplifier;
   means for applying the output of said drive power source to said electroluminescent element through an electrical current path to provide an electric current flow through said electroluminescent element;
   a current detecting element electrically connected with said electrical current path for detecting the current flowing through said electroluminescent element;
   a rectifying circuit for rectifying a voltage induced in said current detecting element;
   a comparator for comparing the output voltage of said rectifying circuit with a reference voltage to provide an output voltage corresponding to the difference therebetween; and
   means for applying the output voltage of said comparator to said voltage-controlled ac amplifier to control the gain of said ac amplifier, thereby keeping the current flowing through said electroluminescent element constant.

2. A circuit for driving a dispersion type electroluminescent element whose brightness or luminescence can be changed by changing the frequency of a voltage applied to said electroluminescent element and can be kept constant by keeping the current flowing through said electroluminescent element constant, said circuit comprising:
   a drive power source having a voltage-controlled oscillator whose oscillation output frequency is variable;
   means for applying the output of said drive power source to said electroluminescent element through an electrical current path to provide an electric current flow through said electroluminescent element;
   a current detecting element electrically connected with said electrical current path for detecting the current flowing through said electroluminescent element;
   a rectifying circuit for rectifying a voltage induced in said current detecting element;
   a comparator for comparing the output voltage of said rectifying circuit with a reference voltage to provide an output voltage corresponding to the difference therebetween; and
   means for applying the output voltage of said comparator to said voltage-controlled oscillator to control the oscillation frequency of said oscillator, thereby keeping the current flowing through said electroluminescent element constant.

3. A circuit for driving a dispersion type electroluminescent element whose brightness can be changed by changing the frequency of a voltage applied to said electroluminescent element and can be kept constant by keeping the current flowing through said electroluminescent element constant, said circuit comprising:
   a drive power source whose output voltage frequency is variable by the application of a control signal thereto;
   means for applying the output of said drive power source to said electroluminescent element through an electrical current path to provide an electric current flow through said electroluminescent element;
   a current detecting element electrically connected with said electrical current path for detecting the current flowing through said electroluminescent element;

means for generating as said control signal a signal related to the current detected by said current detecting element; and means for applying said control signal to said drive power source to keep the current flowing through said electroluminescent element.

4. A driving circuit as in claim 1, wherein said current detecting element is a resistor.

5. A driving circuit as in claim 2, wherein said current detecting element is a resistor.

6. A driving circuit as in claim 3, wherein said current detecting element is a resistor.

7. A driving cricuit as in claim 1, wherein said current detecting element comprises a current transformer.

8. A driving circuit as in claim 2, wherein said current detecting element comprises a current transformer.

9. A driving circuit as in claim 3, wherein said current detecting element comprises a current transformer.

* * * * *